(12) United States Patent
Ota

(10) Patent No.: US 12,358,462 B2
(45) Date of Patent: Jul. 15, 2025

(54) PASSENGER VEHICLE WITH COLLISION DAMAGE MITIGATION MECHANISM

(71) Applicant: Tetsu Ota, Sagamihara (JP)

(72) Inventor: Tetsu Ota, Sagamihara (JP)

(73) Assignee: Life Labo Corp., Sagamihara (JP)

( * ) Notice: Subject to any disclaimer, the term of this patent is extended or adjusted under 35 U.S.C. 154(b) by 0 days.

(21) Appl. No.: 18/634,940

(22) Filed: Apr. 13, 2024

(65) Prior Publication Data

US 2024/0343220 A1    Oct. 17, 2024

(51) Int. Cl.
*B60R 21/36* (2011.01)
*B60R 21/0134* (2006.01)

(52) U.S. Cl.
CPC .......... *B60R 21/36* (2013.01); *B60R 21/0134* (2013.01)

(58) Field of Classification Search
CPC .............. B60R 2021/346; B60R 21/36; B60R 2019/026; B60R 21/23138; B60N 2/04
See application file for complete search history.

(56) References Cited

U.S. PATENT DOCUMENTS

| 2006/0043712 | A1* | 3/2006 | Hakki ................. | B60R 21/36 280/735 |
| 2008/0119993 | A1* | 5/2008 | Breed ................. | G01S 7/023 701/45 |
| 2017/0182970 | A1* | 6/2017 | Wu ................. | B60R 21/0134 |
| 2017/0267205 | A1* | 9/2017 | Numazawa ....... | B60R 21/23138 |
| 2021/0309124 | A1* | 10/2021 | Fields .................. | B60N 2/0276 |
| 2023/0154659 | A1* | 5/2023 | Lee ....................... | B60N 2/015 361/141 |

FOREIGN PATENT DOCUMENTS

| EP | 1777120 B1 | * 12/2008 | ........... B60R 21/233 |
| JP | 2017052370 A | * 3/2017 | |
| KR | 20160020161 A | * 2/2016 | |

OTHER PUBLICATIONS

Okada, Vehicle Structure, Mar. 16, 2017, EPO, JP 2017052370 A, Machine Translation of Description (Year: 2017).*
Kim, External Air Bag Control Apparatus and Method for Vehicle, Feb. 23, 2016, EPO, KR 20160020161 A, Machine Translation of Description (Year: 2016).*

* cited by examiner

*Primary Examiner* — Paul N Dickson
*Assistant Examiner* — Matthew D Lee

(57) ABSTRACT

A passenger vehicle for travelling on a road includes: a processing unit; object sensors arranged on a plurality of locations in a plurality of directions with respect to a center of the passenger vehicle and capable of sensing an external object; and buffer forming devices arranged on a plurality of locations in a plurality of directions with respect to the center of the passenger vehicle, wherein the processing unit is connected to the object sensors and the buffer forming devices, and predicts a collision of the passenger vehicle with an external object by input from the object sensor, the processing unit predicts, when predicting a collision, the direction or location of the collision and causes a buffer forming device to form a buffer corresponding to the direction or location of the predicted collision, and thereby reducing an impact of the collision on the passengers by the buffer.

7 Claims, 17 Drawing Sheets

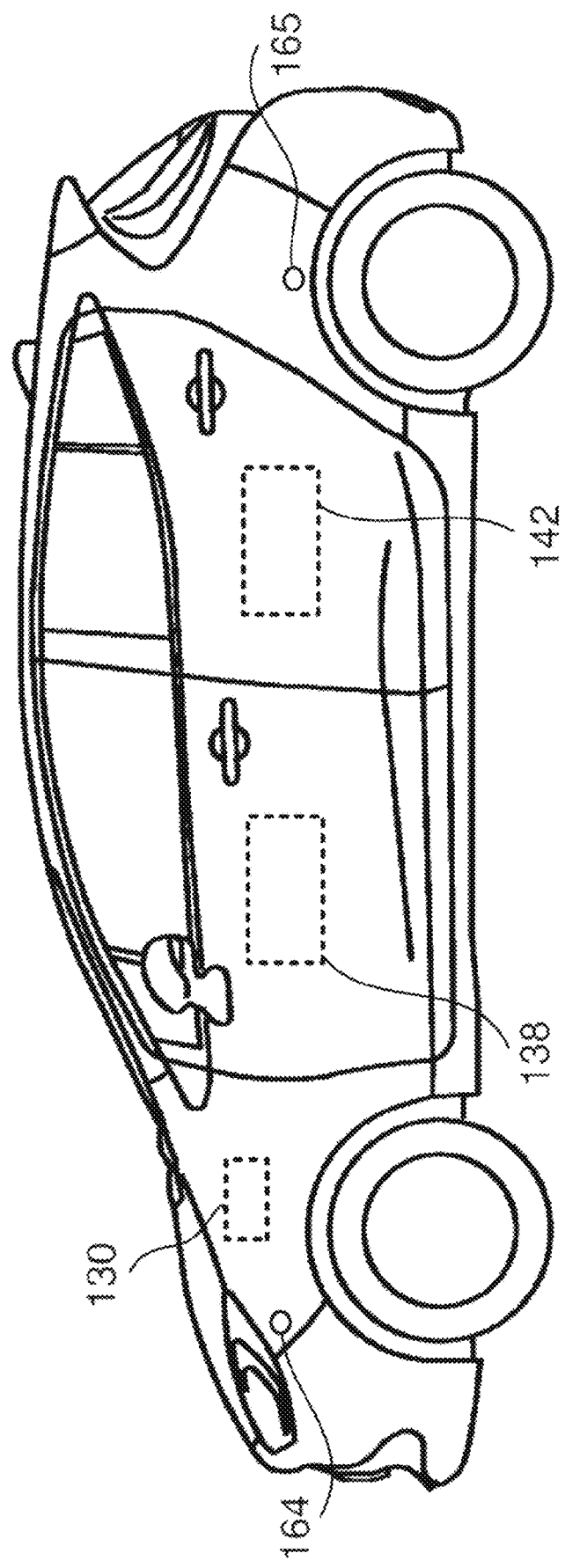

PASSENGER VEHICLE WITH COLLISION DAMAGE MITIGATION MECHANISM

TECHNICAL FIELD

The present invention relates to the field of a passenger automobile including a collision damage mitigation mechanism.

BACKGROUND ART

Vehicles are equipped with collision mitigation braking systems, lane keep assisting systems, and blind spot monitoring systems as safety devices in order to deal with situations where the vehicle is hit by another vehicle or the vehicle hits an object. In order to achieve this, information is obtained by a distance sensor or analyzing images of a camera, a dangerous situation is detected by a processing unit, and the safety device intervenes in braking and steering.

In passenger vehicles, an airbag device is activated after an actual collision to protect the passengers ("passenger" includes all the occupants including the driver in the context of the present invention). It is becoming increasingly important for autonomous driving to protect other vehicles and pedestrians while protecting the own vehicle and the passengers. In addition, it is expected that more vehicles, such as battery-powered electric vehicles, will have more available space in the vehicle than vehicles powered by internal combustion engines.

SUMMARY OF INVENTION

An object of the present invention is to provide a high degree of safety to a vehicle by predicting a collision before the collision and reducing the impact of the collision with a special mechanism.

An aspect of the present invention relates to a passenger vehicle for travelling on a road, comprising:
a processing unit;
object sensors arranged on a plurality of locations in a plurality of directions with respect to a center of the passenger vehicle and capable of sensing an external object; and
buffer forming devices arranged on a plurality of locations in a plurality of directions with respect to the center of the passenger vehicle, wherein
the processing unit is connected to the object sensors and the buffer forming devices, and predicts a collision of the passenger vehicle with an external object by input from the object sensor, and
the processing unit predicts, when predicting a collision, the direction or location of the collision and causes a buffer forming device to form a buffer corresponding to the direction or location of the predicted collision,
thereby reducing an impact of the collision on the passengers by the buffer.

In one aspect of the invention, the buffer is an airbag.

In one aspect of the invention, the buffer is an airbag which is ejected out of the passenger vehicle and detached from the passenger vehicle, except for a string-like member if there is a string like member.

In one aspect of the invention, the buffer forming device is included in a add-on type device fixed onto a roof of the passenger vehicle.

In one aspect of the invention, the buffer forming device uses a chemical or physical reaction of a fluid to form the buffer.

In one aspect of the invention, there are a plurality of compartments in the vehicle, each of which includes a seat for a passenger and forms the buffer forming device, and when predicting a collision, the compartment corresponding to the collision is moved to a direction other than a direction of the predicted collision and forms the buffer in a space around the compartment, in order to mitigate the impact of the collision.

In one aspect of the invention, when predicting a collision, an adjacent compartment to the compartment corresponding to the collision is moved to the opposite side to the predicted collision, in order to mitigate the impact of the collision.

In one aspect of the invention, when predicting a collision, a door which is on a side of the adjacent compartment and on the opposite side to the predicted collision is opened to move the adjacent compartment to furthermore.

In one aspect of the invention, when predicting a collision, the compartment corresponding to the collision is moved upwards in order to mitigate the impact of the collision.

In one aspect of the invention, when the compartment is moved upwards, a roof of the passenger vehicle opens so as to move the compartment above the roof.

In one aspect of the invention, when the compartment is moved upwards, a string-like member connected between the compartment and the vehicle prevents the compartment from going too far.

In one aspect of the invention, when the string-like member has elasticity in order to prevent a strong impact force being applied to the compartment.

The passenger vehicle may be a four-wheeled vehicle, a truck, a military vehicle (such as a tank), a three-wheeled vehicle, a two-wheeled vehicle, etc., and is provided with wheels. A four-wheeled vehicle is particularly preferable. The power source may be of any type but it is particularly effective in the case of electric vehicles because there are more spaces that can be used compared to internal combustion engine type vehicles.

The object sensor detects the presence of an object and may be a camera, a millimeter wave sensor, a distance sensor, etc., and object sensors are arranged on a plurality of locations in a plurality of directions with respect to the center of the vehicle.

The processing unit may be, for example, a safety control unit and includes a processor, a memory, etc.

The number of the buffer forming device is preferably four or more on the front side, the left side, the relatively-front part on the right side, and the rear side of the vehicle, more preferably six or more on the front side, the relatively-front part on the left side, the relatively-rear part on the left side, the relatively-front part on the right side, the relatively-rear part on the right side, and the rear side of the vehicle, and still more preferably eight or more on the relatively-left part on the front side, the relatively-right part on the front side, the relatively-front part on the left side, the relatively-front part on the left side, the relatively-rear part on the left side, the relatively-front part on the right side, the relatively-rear part on the right side, the relatively-left part on the rear side, and the relatively-right part on the rear side of the vehicle.

Examples of the buffer forming device include: an airbag device for forming an airbag on the exterior of the airbag device with built-in explosive material; a device that forms a solid substance on the exterior of the device; a device that forms a solid substance instantaneously by reaction between the fluid and another substance; and a device that forms a solid substance instantaneously by an effect of low temperature of liquid nitrogen.

Examples of the buffer include an airbag, a solid substance, and an elastic body such as foamable polymer.

In accordance with one aspect of the present invention, the buffer forming device forms a buffer on the outside of the vehicle including the outside of the door.

In accordance with one aspect of the present invention, there is provided with an add-on type device installed on the roof. The add-on type device is provided with a plurality of buffer forming devices, and the corresponding buffer forming device forms a buffer in the direction in which the collision on the exterior of the vehicle is predicted, upon collision prediction.

In accordance with one aspect of the present invention, the vehicle has a plurality of cavities at a plurality of locations including the inside of the door, each cavity has a plurality of corresponding buffer forming devices, and upon collision prediction, a part of the buffer forming devices corresponding to the predicted direction of the collision are activated to form a buffer in the cavity.

In accordance with one aspect of the present invention, the vehicle has a plurality of cavities at a plurality of locations including the inside of the door; the vehicle has a buffer forming device including a reservoir, a plurality of valves, and a feeding device; each valve of the buffer forming device and each cavity communicate with each other by a passage (pipe); and upon collision prediction, the corresponding valve of the buffer forming device opens (or valves other than the corresponding valve close), explosive material in the feeding device in the reservoir explodes, the fluid in the reservoir is fed to the pipe to reach the cavity corresponding to the opened valve, and the reaction of the fluid forms a solid buffer, reducing the damage of collision.

In accordance with one aspect of the present invention, there are a plurality of compartments in the vehicle, each of which includes a seat for a passenger, and when predicting a collision, the corresponding passenger compartment itself is moved to a direction other than the predicted collision, for example, the opposite side to the collision, in order to mitigate the impact of the collision.

The compartment is provided with a buffer forming device, and a buffer is created from the compartment side to form a buffer, reducing the damage of the collision. The passenger protection device forms an airbag to reduce collision damage.

The compartment is preferably contractable, which makes it possible to increase the distance traveled by a compartment where the collision is expected.

In addition, a door (in this case, left door), preferably a door opposite to the collision in the vehicle width direction, is automatically opened to move a (left) compartment opposite to the collision in the vehicle width direction, preferably bringing a part or all of the compartment out to the left side, so that a (right) compartment where a collision is expected can be evacuated to the left furthermore.

In accordance with one aspect of the present invention, the seat is moved upward upon anticipating a collision. There are a plurality of compartments in the vehicle, each including a seat and a seat belt for a passenger. When predicting a collision, the corresponding passenger compartment itself is moved upwards, that is, to the space above the roof.

The roof is a roof that can be opened by, for example, an opening and closing mechanism or by being detached partially.

There are a launch device and a directional guidance mechanism underneath each compartment.

When a collision is predicted, the launch device ejects the compartment itself upward along a direction guided by a direction guidance mechanism.

An elastic string-like member is connected to the direction guidance mechanism and the compartment. The direction guidance mechanism prevents the compartment from going too far by the string-like member and prevents a strong shock force from being applied to the compartment by the elasticity of the string-like member.

A free fall of the compartment can be avoided by a directional guidance mechanism forming a support member for supporting the compartment. The support member may be one that can be extended or retracted by a telescopic type extension and retraction mechanism.

In accordance with one aspect of the present invention, the buffer on the roof is moved upon anticipating a collision. A buffer driving mechanism is fixed on the roof. A buffer is arranged on the buffer driving mechanism. When a collision is predicted, the buffer driving mechanism moves the buffer in the direction in which the collision is expected so as to mitigate the collision.

In accordance with one aspect of the present invention, a part or all of the buffer forming device on the roof expands to form a buffer. On the roof, there are a plurality of buffer forming devices that can be expanded. Only a buffer forming device corresponding to the direction of the collision moves to the buffering position and expands upon collision prediction.

The reference signs in the claims are not to be used for interpreting an element for limiting the meaning of the element. The aims, advantages and features of the present invention will become apparent from the detailed description below with reference to the following figures:

BRIEF DESCRIPTION OF THE DRAWINGS

FIG. 1A shows a front view, FIG. 1B shows a rear view, FIG. 1C shows a left-side view, and FIG. 1D shows a top view. In the following figures, there are many elements illustrated in previous figures, but they are not illustrated and will not be described for the sake of simplicity.

FIGS. 2A-2D show a vehicle according to an embodiment in which a buffer is formed on the outside. FIG. 2A shows a front view, FIG. 2B shows a rear view, FIG. 2C shows a left-side view, and FIG. 2D shows a top view.

FIG. 6A shows a left-side view and FIG. 6B shows a top view.

In FIG. 7B, the compartments are contractable.

FIG. 9A shows a top view, and FIG. 9B shows a front view.

DETAILED DESCRIPTION OF THE INVENTION

Figure 1A:
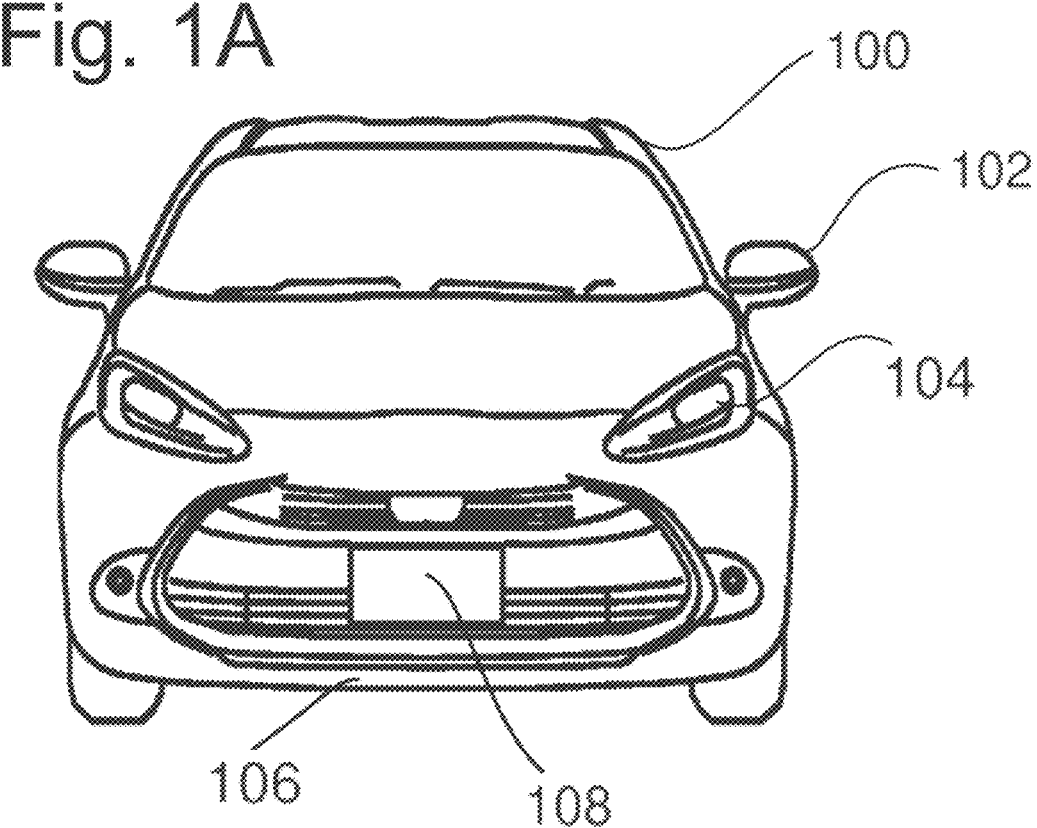
FIGS. 1A-1D show a conventional four-wheeled vehicle.
Figure 1B:
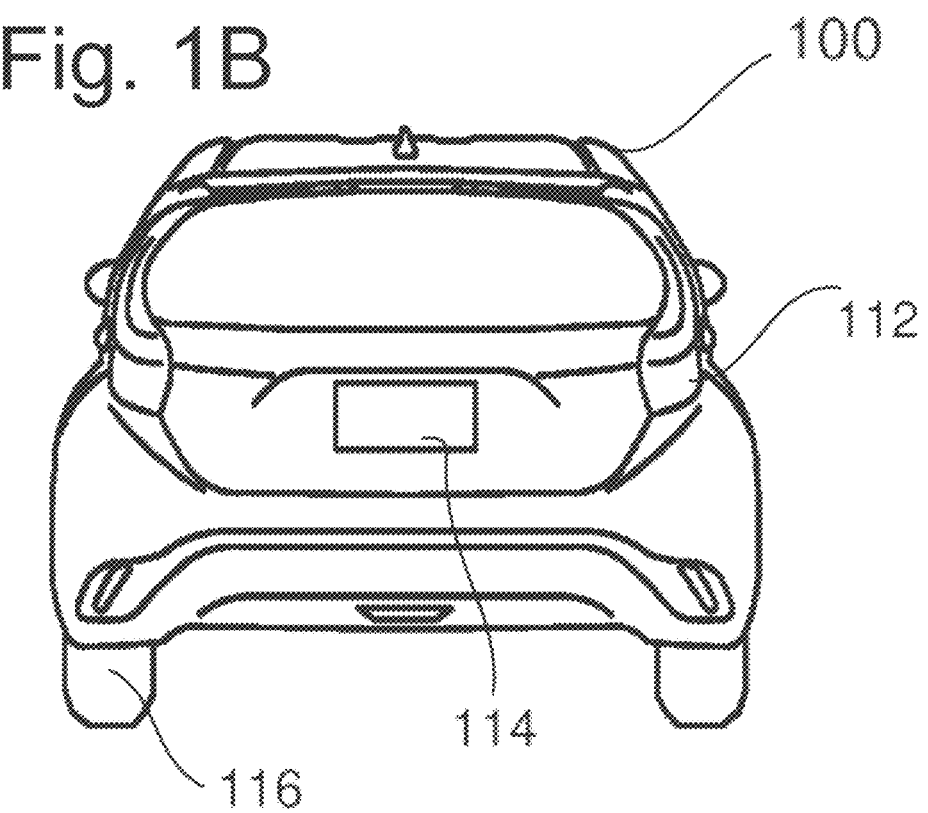
Figure 1C:
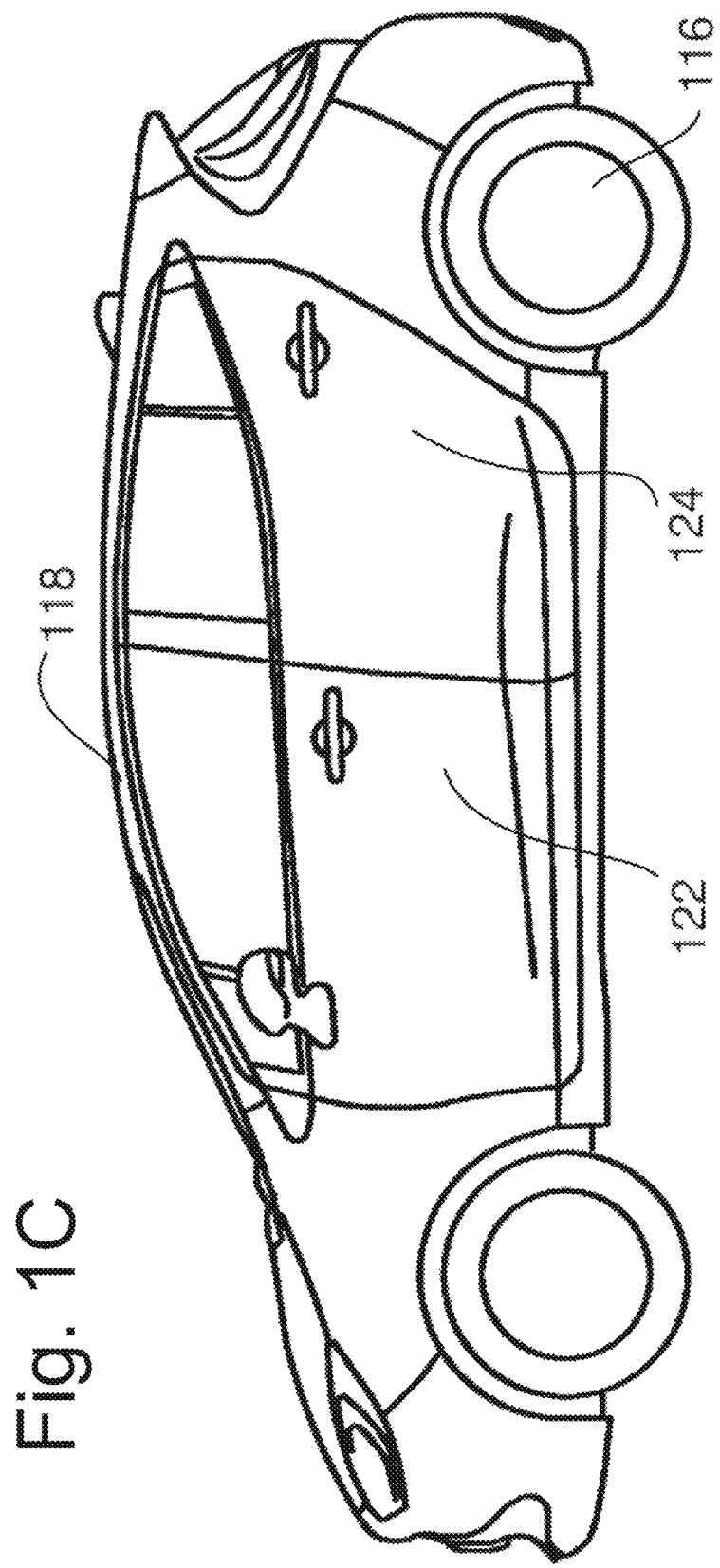
Figure 1D:
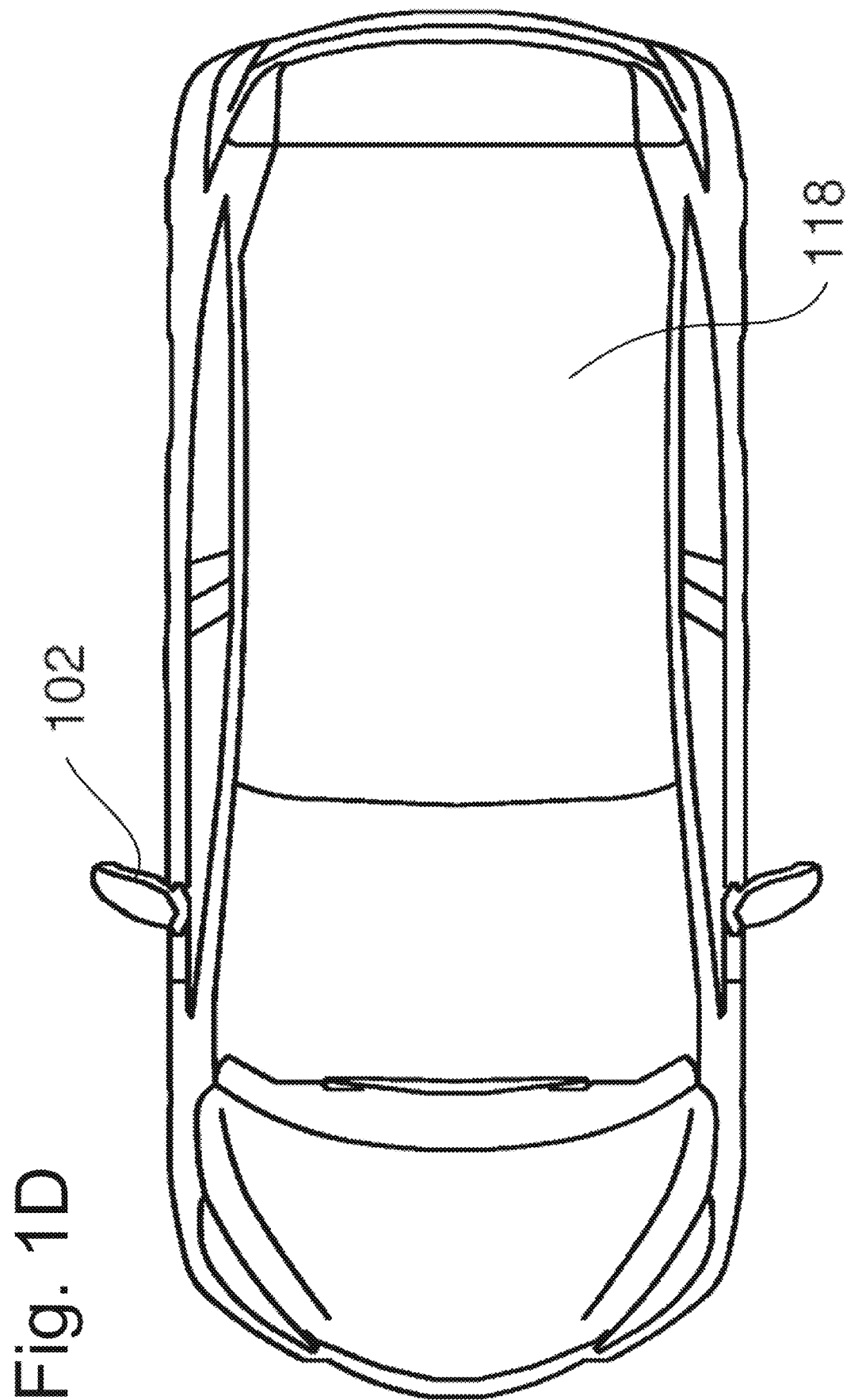
Figure 2A:
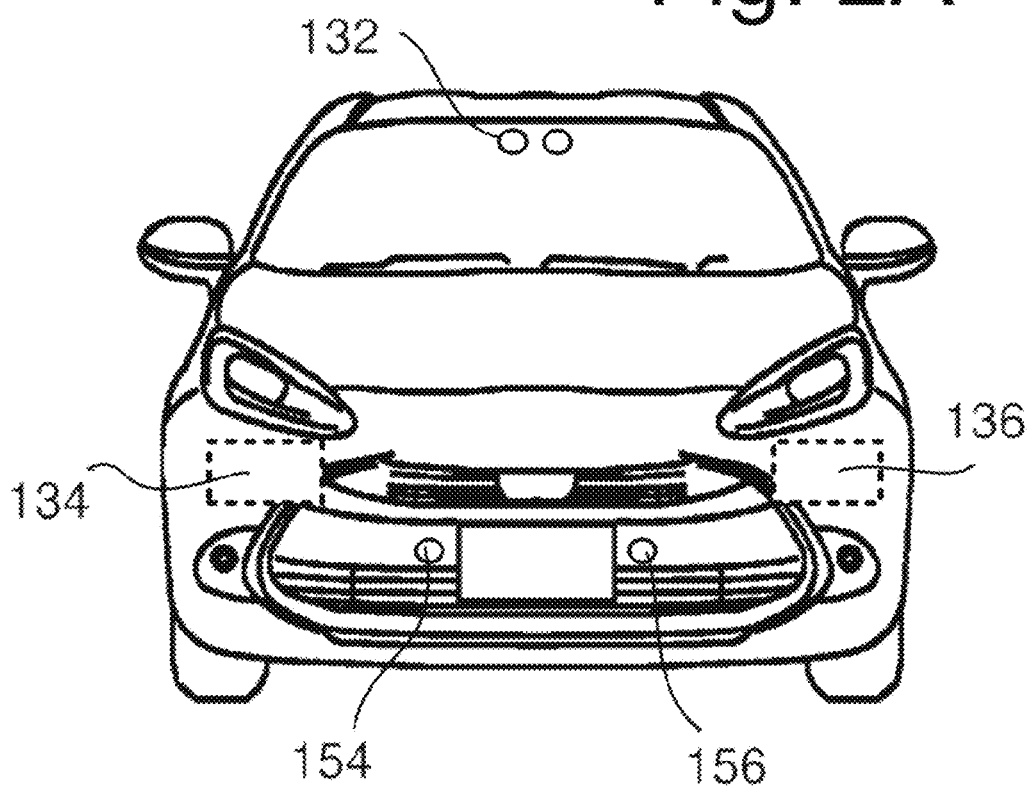
Figure 2B:
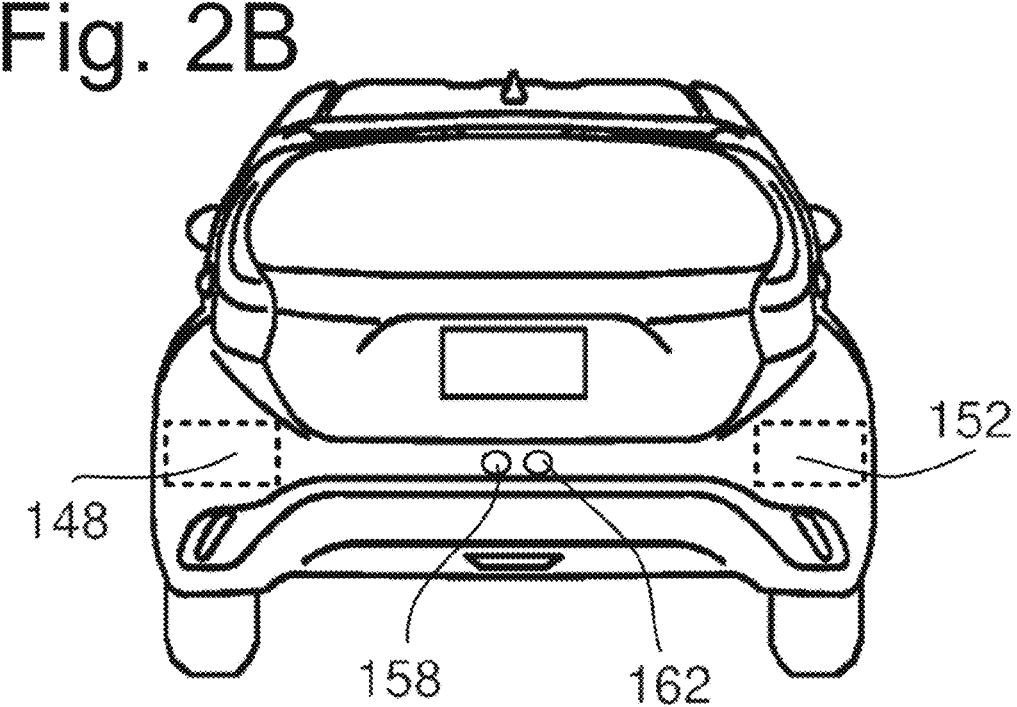
Figure 2D:
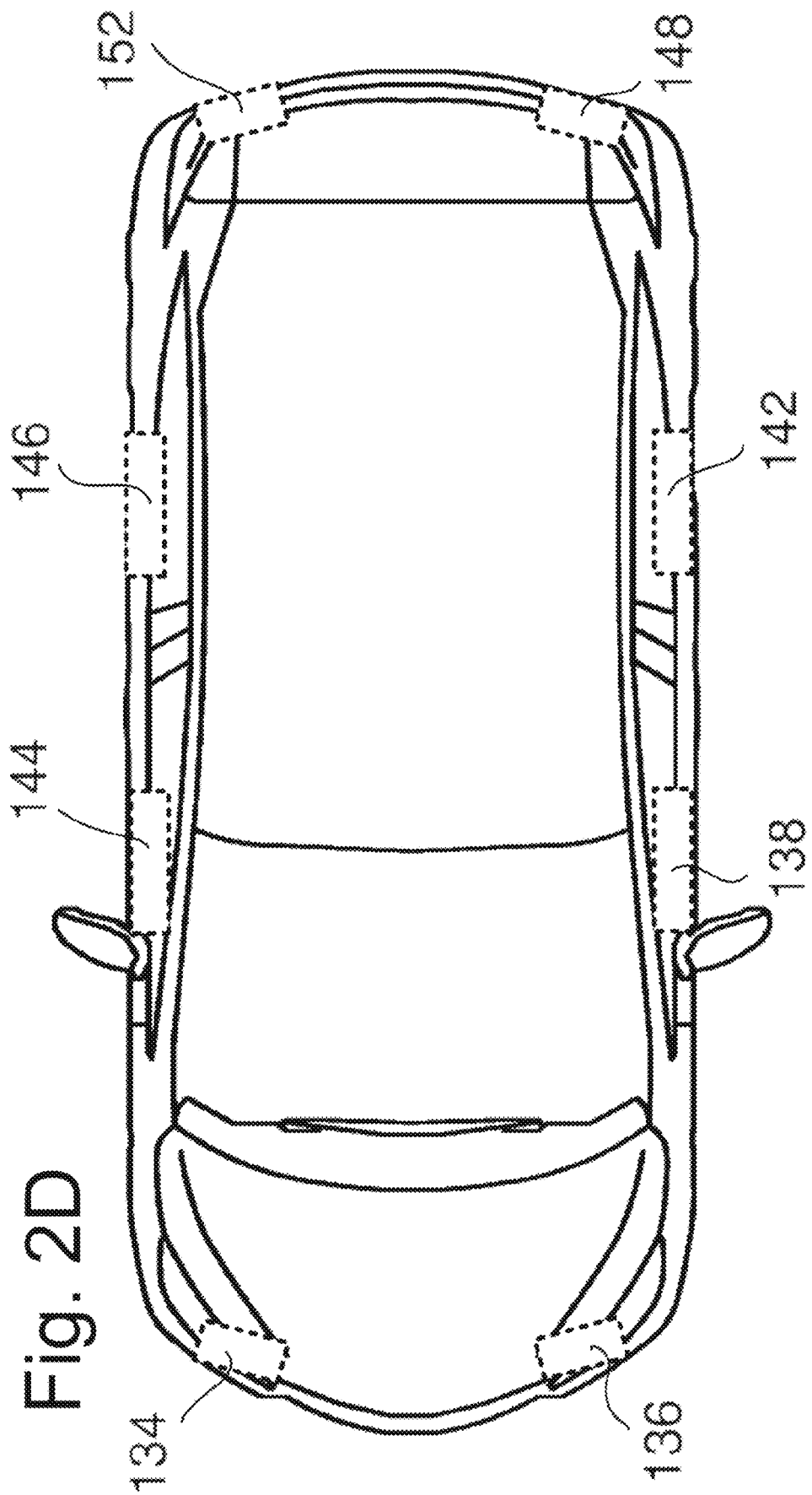

FIGS. 1A-1D show a vehicle 100, which is a conventional four-wheeled vehicle.

The vehicle 100 includes a headlight 104, a license plate 108, 114, a front bumper 106, side mirrors 104, taillights 112, wheels 116, boarding doors 122, 124, a roof 118, etc. The vehicle 100 may be an automobile with an internal combustion engine, or may be an electric vehicle with electric motors. Vehicles illustrated in the following drawings are based on this vehicle and have all the elements of this vehicle.

(1) Forming a Buffer on the Exterior]

FIGS. 2A-2D show a vehicle based on the vehicle of FIGS. 1A-1D.

The vehicle includes a processing unit 130, object sensors 132, 154, 156, 158, 162, 164, 165, and buffer forming devices 134, 136, 138, 142, 144, 146, 148, 152 as compared to the vehicle of FIGS. 1A-1D.

The processing unit 130 is constituted by a processor, a memory, etc., and is connected to the respective object sensors and buffer forming devices.

The object sensor is constituted by a camera, a distance sensor based on millimeter-wave radar, etc. In this vehicle, there is an object sensor 132, which has two cameras, on the upper side of the inside of the windshield, and there is an object sensor 154, which is a millimeter-wave radar type distance sensor, on the front of the vehicle. The processing unit 130 processes information from the object sensor to predict the occurrence of the collision and the direction or the location of the collision.

There are eight buffer forming devices 134, 136, 138, 142, 144, 146, 148, 152: front left, front right, front part on the left side, rear part on the left side, front part on the right side, rear part on the right side, rear left side, and rear right side. In this vehicle, the buffer forming device is an airbag device which forms an airbag on the exterior of the vehicle when activated to protect the vehicle and the other party to the collision when there is a collision. The airbag device has the same mechanism as a conventional airbag device used inside a vehicle, and includes explosive material inside, and the explosion of explosive material instantly forms an inflated airbag. The shape and size of the airbag are determined as appropriate to mitigate the damage caused by the collision.

When the processing unit 130 predicts a collision from a specific direction, the corresponding buffer forming device is activated to form a buffer, which in this case is an airbag, on the exterior of the vehicle, reducing the damage of the collision. For example, when the processing unit 130 predicts a collision from the right side of the vehicle toward the right front seat, a buffer forming device 144 on the relatively-front part on the right side is activated (typically, another buffer forming device is also activated) to form a buffer on the exterior of the vehicle on the relatively-front part on the right side, reducing the damage of the collision.

In addition, in the normal operating situation, the processing unit 130 has a knowledge of the seat(s) where the passengers is on board by passenger sensors (not illustrated). Where to form the buffer is determined according to the boarding situation of the passengers. This is also the case in other embodiments described below.

(2) Forming the Buffer on the Exterior (Add-On Type Device)]

Figure 3:
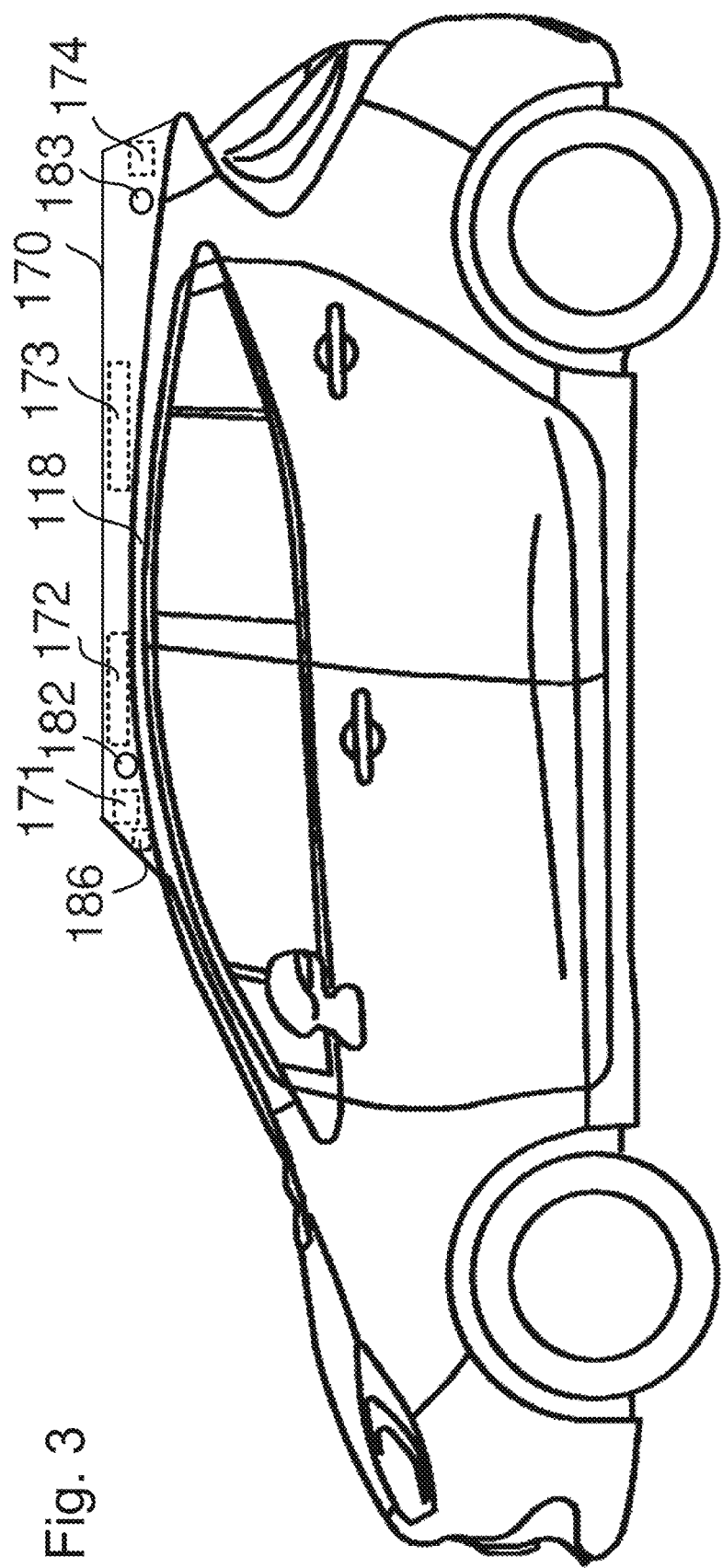
FIG. 3 shows a left-side view of a vehicle according to an embodiment in which an add-on type device is on the roof.

FIG. 3 shows an embodiment in which the buffer is formed on the exterior of the vehicle by an add-on type device 170. The add-on type device 170 is fixed on the roof 118 of the vehicle.

Object sensors 182 and 183 are located at six locations on the front side, the relatively-front part on the left side, the relatively-rear part on the left side, the relatively-front part on the right side, the relatively-rear part on the right side, and the rear side on the add-on type device.

Similarly, there are eight buffer forming devices: front left 171, front right, front part on the left side 172, rear part on the left side 173, front part on the right side, rear part on the right side, rear side left 174, and rear side right.

When the processing unit 130 predicts a collision from a specific direction, the corresponding buffer forming device is activated to form a buffer, which in this case is an airbag, on the exterior of the vehicle, reducing the damage of the collision. For example, when the processing unit 130 predicts a collision from the left side of the vehicle toward the left front seat, the buffer forming device 172 on the relatively-front part on the left side is activated (typically, other buffer forming devices 171, 173, 174 are also activated) to form a buffer in front of the door outside of the vehicle on the relatively-front part on the left side, reducing the damage of the collision.

In this way, by using the add-on type device 170 fixed on the roof 118, it is possible to provide safety devices on cases where the need for safety is increased, when the vehicle does not have a safety device, etc., while simplifying the lower side of the vehicle.

The add-on type device 170 can provide convenience to the user by having a photovoltaic cell, a retractable extending roof (a plate-shaped body is retracted and moves horizontally to form a roof), a pop-up type bed, and a pop-up type foldable type tent. The term "pop-up type" indicates an object in which the entire upper plate-shaped body or one main upper plate-shaped body moves upward to form a space between the upper plate-shaped body and the bottom surface.

(3) Forming a Buffer Inside the Vehicle (Buffer Forming Devices in Cavities)]

Figure 4:
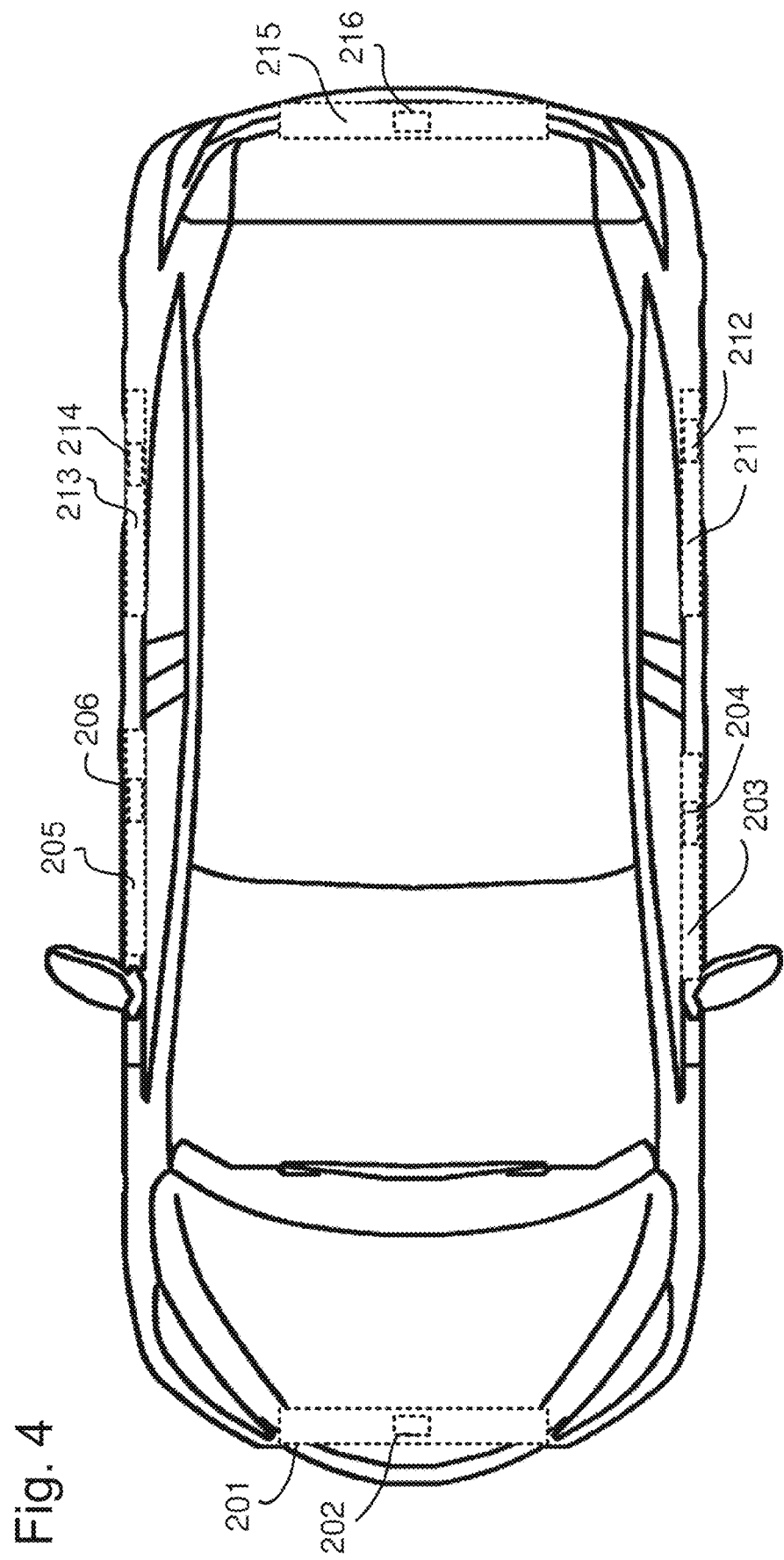
FIG. 4 shows a top view of a vehicle according to an embodiment in which a buffer is formed inside the vehicle.

FIG. 4 shows a vehicle according to an embodiment in which a buffer is formed inside the vehicle body.

The vehicle has cavities in the front side 201, the rear side 215, the relatively-front part on the left side 203, the relatively-rear part on the left side 211, the relatively-front part on the right side 205, and the relatively-rear part on the right side 213. Such cavities are necessary for maintenance and other purposes. The spaces in the cavities may be closed and may not be closed.

There are buffer forming devices 202, 204, 206, 212, 214, 216 on the walls of the cavities.

When the processing unit 130 predicts a collision from a specific direction, the buffer forming device is activated to form a buffer, which in this case is an airbag, reducing the damage of the collision. For example, when the processing unit 130 predicts a collision from the left side of the vehicle toward the front-left seat, the buffer forming device 204 on the relatively-front part on the left side is activated (typically, other buffer forming devices 212, 202, etc. are also activated) to form a buffer in front of the door and outside of the vehicle on the relatively-front part on the left side of the vehicle, reducing the damage of the collision.

(4) Forming a Buffer Inside the Vehicle Body (Sending Fluids from a Reservoir to Cavities)]

Figure 5:
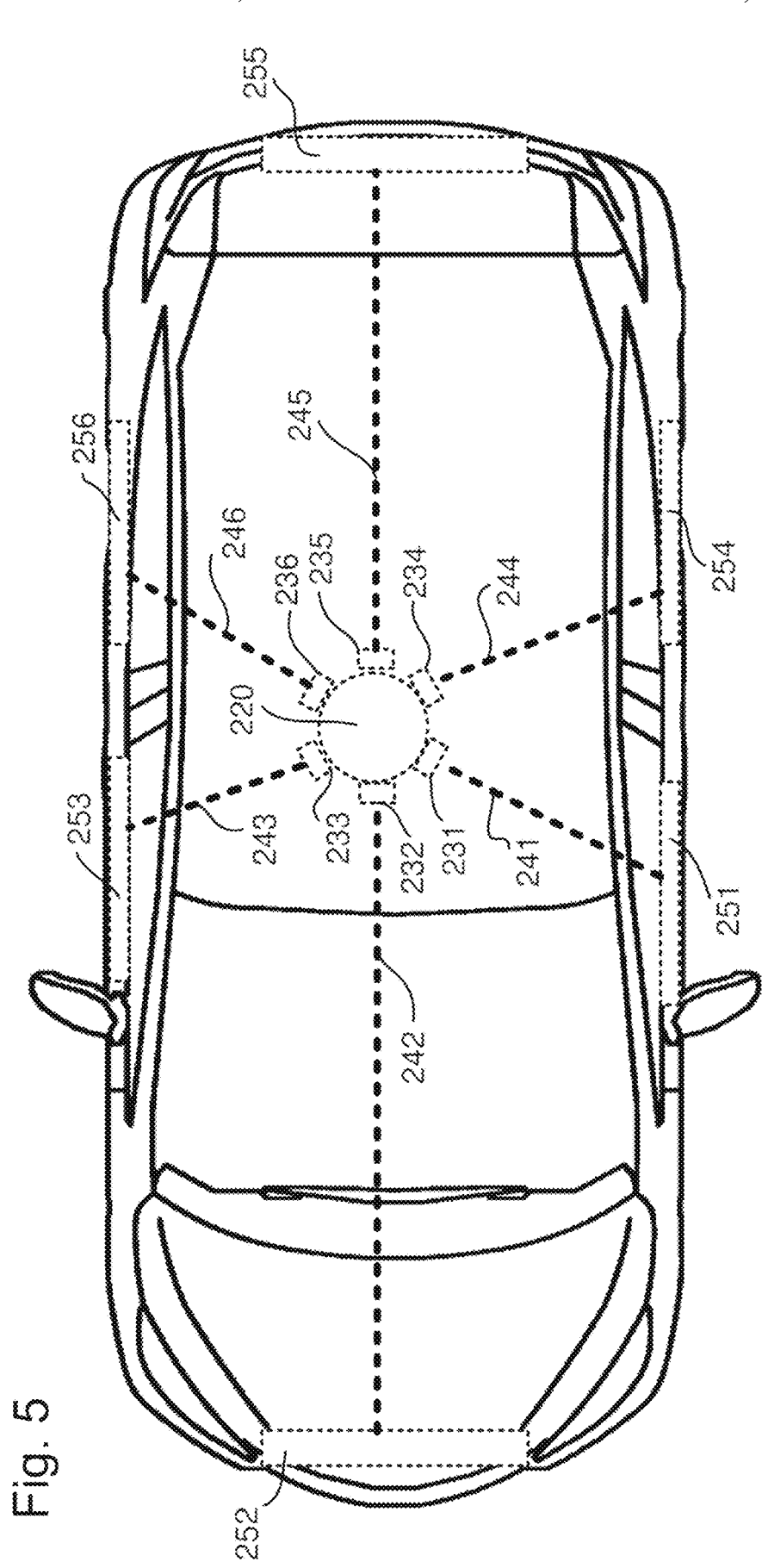
FIG. 5 shows a top view of a vehicle according to an embodiment in which the fluid is fed from the reservoir to the cavities.

FIG. 5 shows a vehicle according to an embodiment in which the fluid is fed from a reservoir to cavities to form a buffer inside the vehicle body.

The vehicle has cavities on the front side 252, the rear side 255, the relatively-front part on the left side 251, the relatively-rear part on the left side 254, the relatively-front part on the right side 253, and the relatively-rear part on the right side 256. Such cavities are necessary for maintenance and other purposes. The cavities may be closed and may not be closed.

The vehicle includes a buffer forming device 220 having a reservoir, valves 231-236, and a feeding device. The valves of the buffer forming device 220 and the cavities are communicated by pipes 241-246.

When the processing unit 130 predicts a collision from a specific direction, the corresponding valve of the buffer forming device opens (or valves other than the corresponding valve close), and the explosive material in the feeder device in the reservoir explodes. Then, the fluid stored in the reservoir reaches the cavity corresponding to the opened valve to form a solid buffer by chemical reaction or physical reaction of the fluid, reducing the damage of the collision. For example, when the processing unit 130 predicts a collision on the relatively-front part on the left side, the valve 231 of the buffer forming device 220 opens (or valves other than the valve 231 close), and the explosive material in the feeder device in the reservoir explodes. Then, the fluid in the reservoir reaches the cavity 251 corresponding to the opened valve 231 to form a solid buffer by chemical reaction or physical reaction of the fluid.

By using such a centralized buffer forming device, the amount of fluid used can be reduced and the installation can be simplified.

The number of centralized buffer forming devices may be more than one, typically two. In this case, a pipe is connected to each cavity from each buffer forming device. Agent A is put in one of the two buffer forming devices, and agent B is put in the other. Agent A and agent B are fed to the cavity upon collision prediction. By doing so, a buffer is formed in the cavity by the reaction of agent A and agent B.

(5) Moving the Seat Horizontally]

FIG. 6 shows a vehicle according to an embodiment in which a seat is moved upon a collision prediction.

The vehicle is a four-seater vehicle, and has a total of four compartments 301-304 in the vehicle, one corresponding to one passenger. Each compartment has a seat having a seat surface 321 and a backrest 322, and a passenger sits on this seat when on board.

Figure 7A:
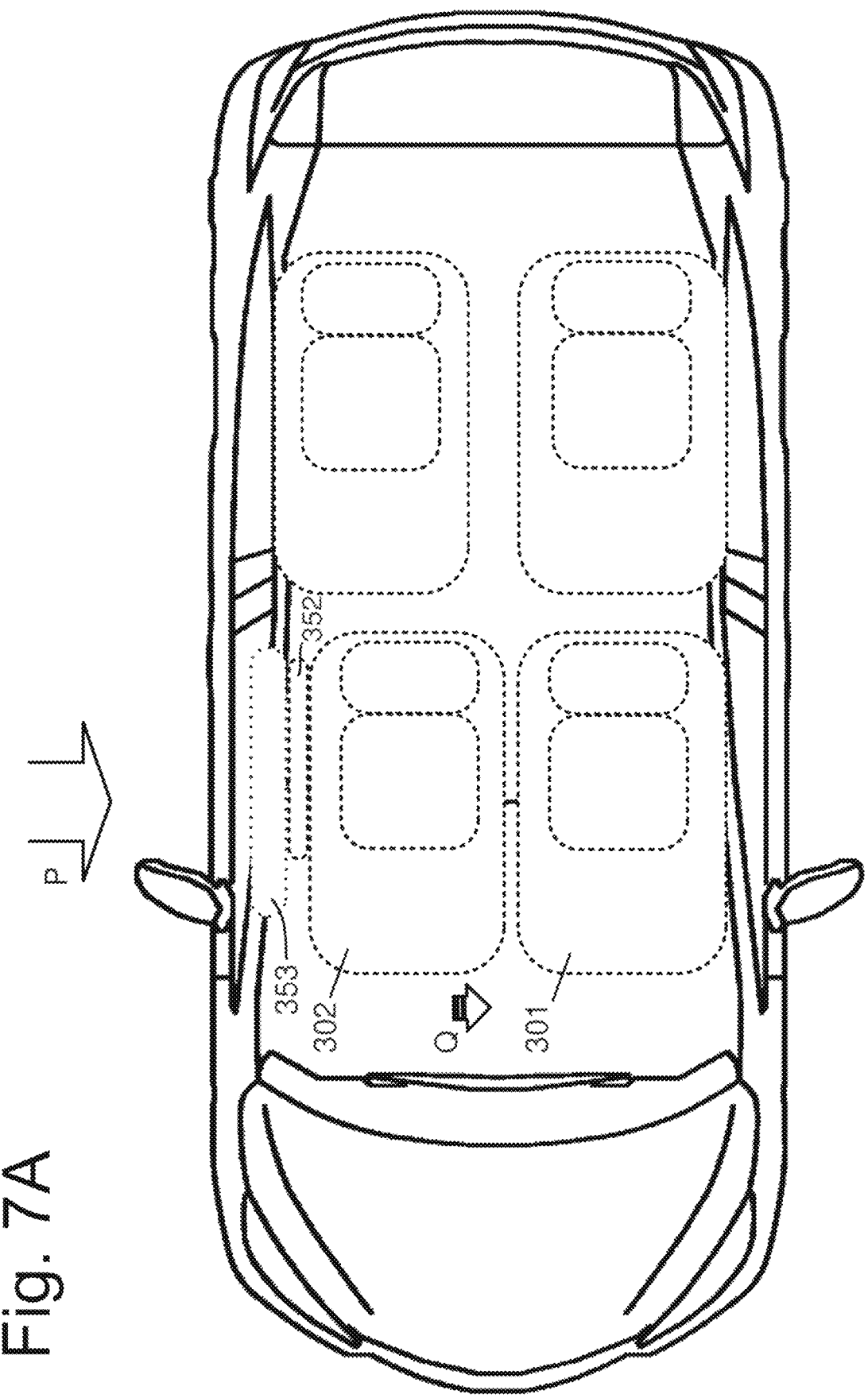
FIGS. 7A-7B show a top view of a vehicle after a seat is moved after the collision prediction.

FIGS. 7A and B show a vehicle after a seat is moved horizontally (left of the vehicle) after the collision prediction.

When the processing unit 130 predicts a collision from the right of the vehicle in a direction of Arrow P toward a passenger sitting on the front-right side of the vehicle, the airbag device equipped on the upper right of the passenger is activated to form an airbag 353, while the compartment 302 of the passenger itself is moved by an explosive or motor on the opposite side from the collision, that is, on the left side (the direction of Arrow Q toward the center in the vehicle width direction). As a result, the space between the part to be hit and the compartment 302 becomes large, and a buffer (for example, an airbag) enters into the space, reducing the damage of the collision (FIG. 7A). Moreover, since the compartment 302 includes a buffer forming device, a buffer (e.g., an airbag) 352 is discharged from the compartment side to form a buffer, reducing the damage of the collision. In addition, an airbag is formed by the passenger protection devices 311 and 312, reducing the damage caused by the collision.

Figure 7B:
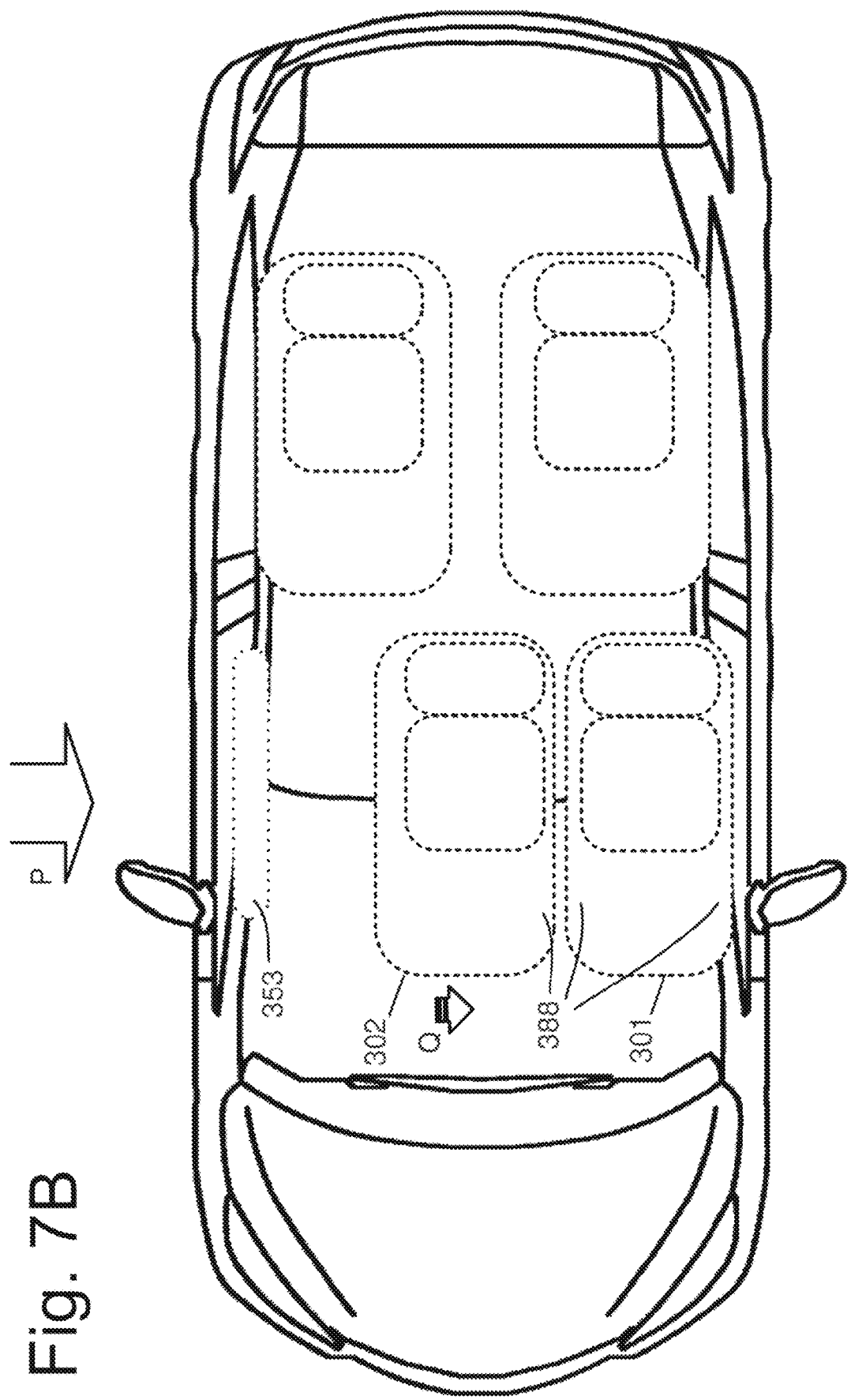

In order to further reduce the damage of the collision, when a collision in the direction of Arrow P toward a passenger sitting on the relatively-front part on the right side of the vehicle is predicted, the airbag device equipped in the upper right of the passenger is activated to form the airbag 353, and adjacent compartment 301 is moved to the left side by about 100 mm to cause the compartment 302 to evacuate to the left side (FIG. 7B). By moving the adjacent compartment 301, it is possible to increase the distance at which the compartment 302 that is expected to collide can be moved. The compartments 301-304 are preferably reversibly contractable, such as by partially being folded. Thereby, when the adjacent compartment 301 is moved, a contraction portion 388 on the left side of the adjacent compartment 301 is contracted by colliding with a door, etc. Moreover, a contraction portion 388 on the right side of the adjacent compartment 301 is also contracted by being pushed by the compartment 302 that is expected to collide. Also, by configuring the compartment 302 that is expected to collide to be contractable, the contraction portion 388 on the left side of the compartment 302 is contracted by colliding with the adjacent compartment 301. As a result, the distance for moving the compartment 302 that is expected to collide can be increased.

Moreover, when a collision is predicted, it is also preferable to cause the compartment 302 to be evacuated furthermore to the left side by: automatically opening the door on the relatively-front part on the left side of the vehicle; and moving the front-left compartment 301 to the left side to move a part or all of the compartment 301 out to the left side.

(6) Moving the Seat Upward

Figure 8:
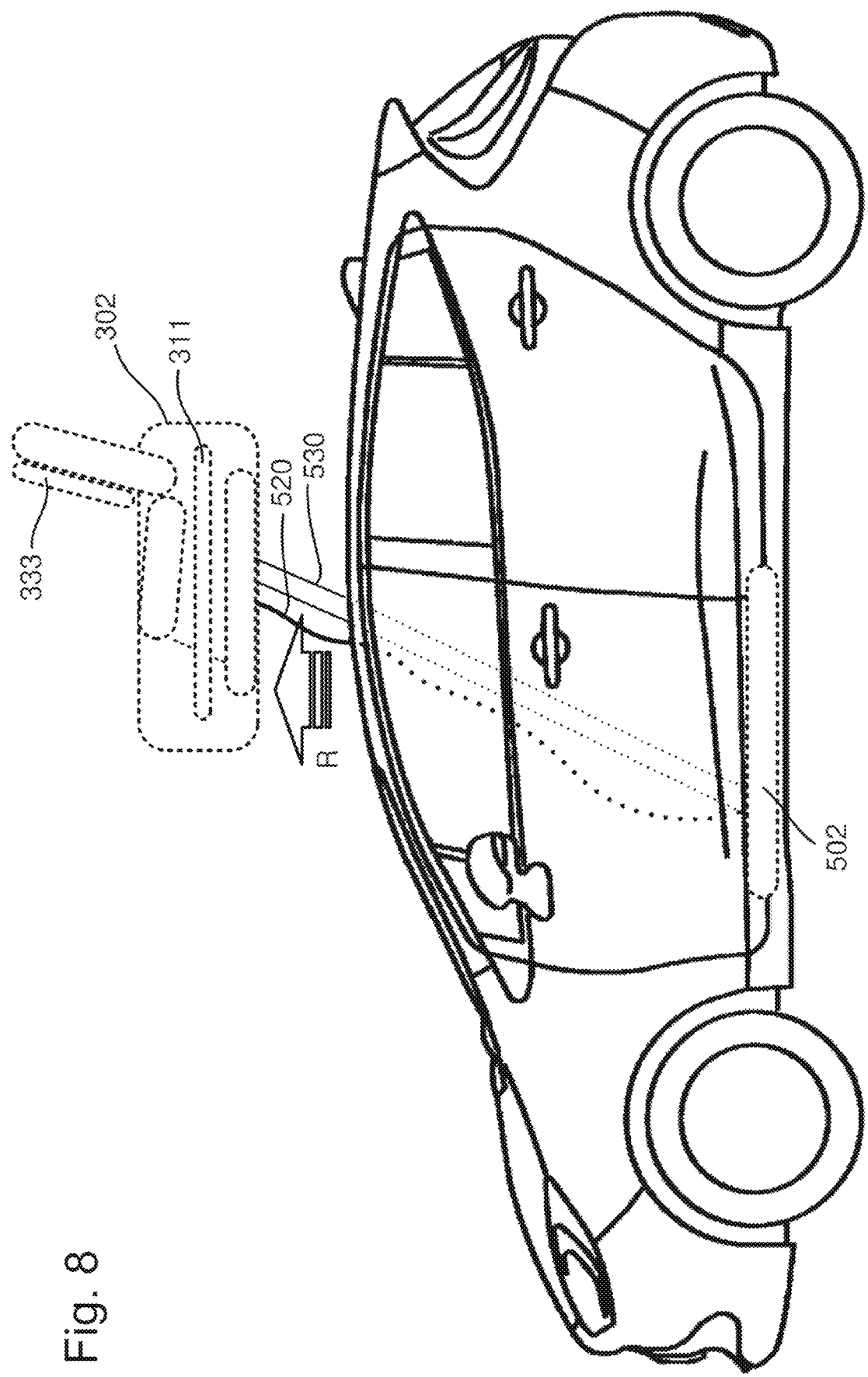
FIG. 8 shows a left-side view of a vehicle according to an embodiment in which a seat is moved upward upon a collision prediction.

FIG. 8 shows a vehicle according to an embodiment in which the seat is moved upward upon the collision prediction.

Figure 6A:
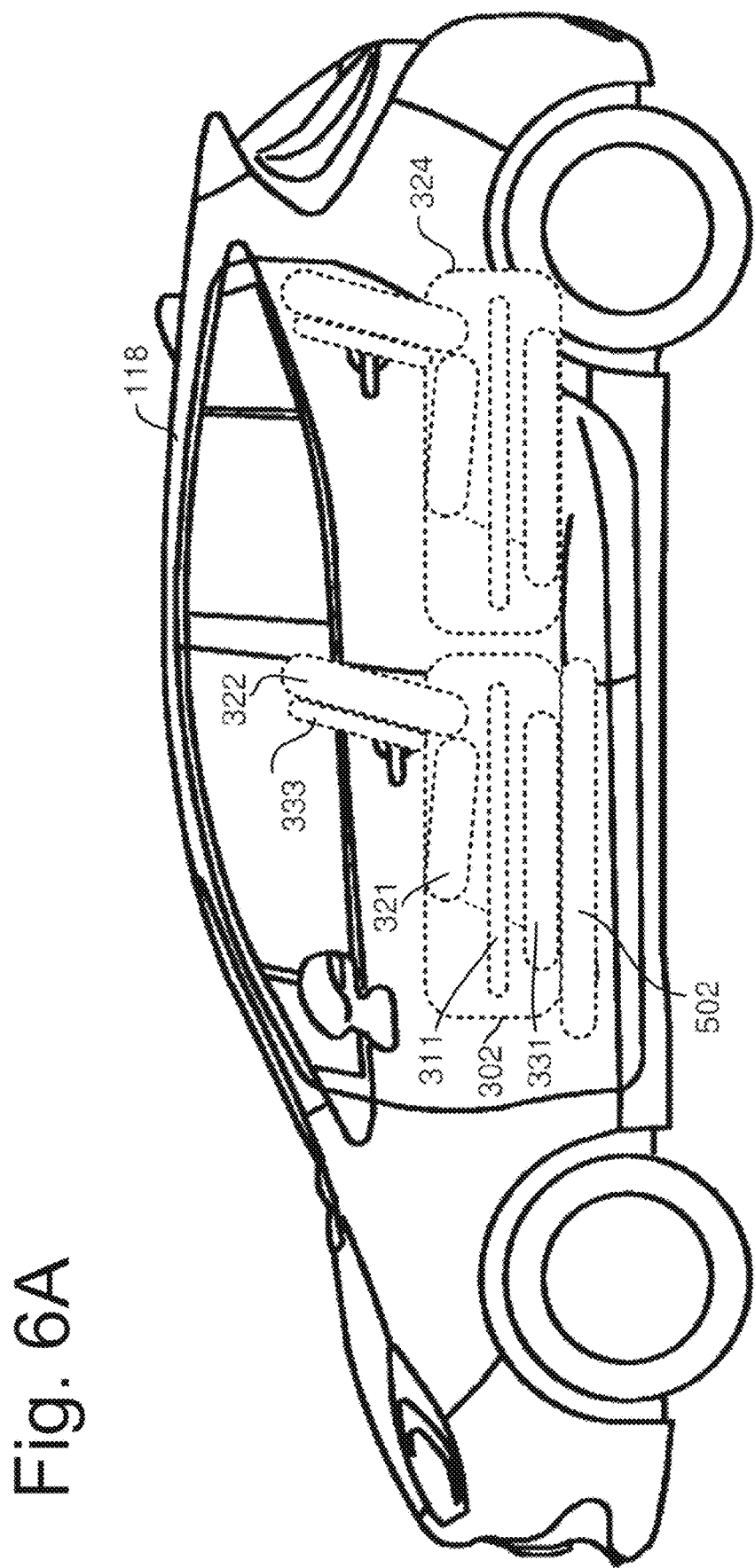
FIGS. 6A-6B show a vehicle according to an embodiment in which a seat is moved upon a collision prediction.
Figure 6B:
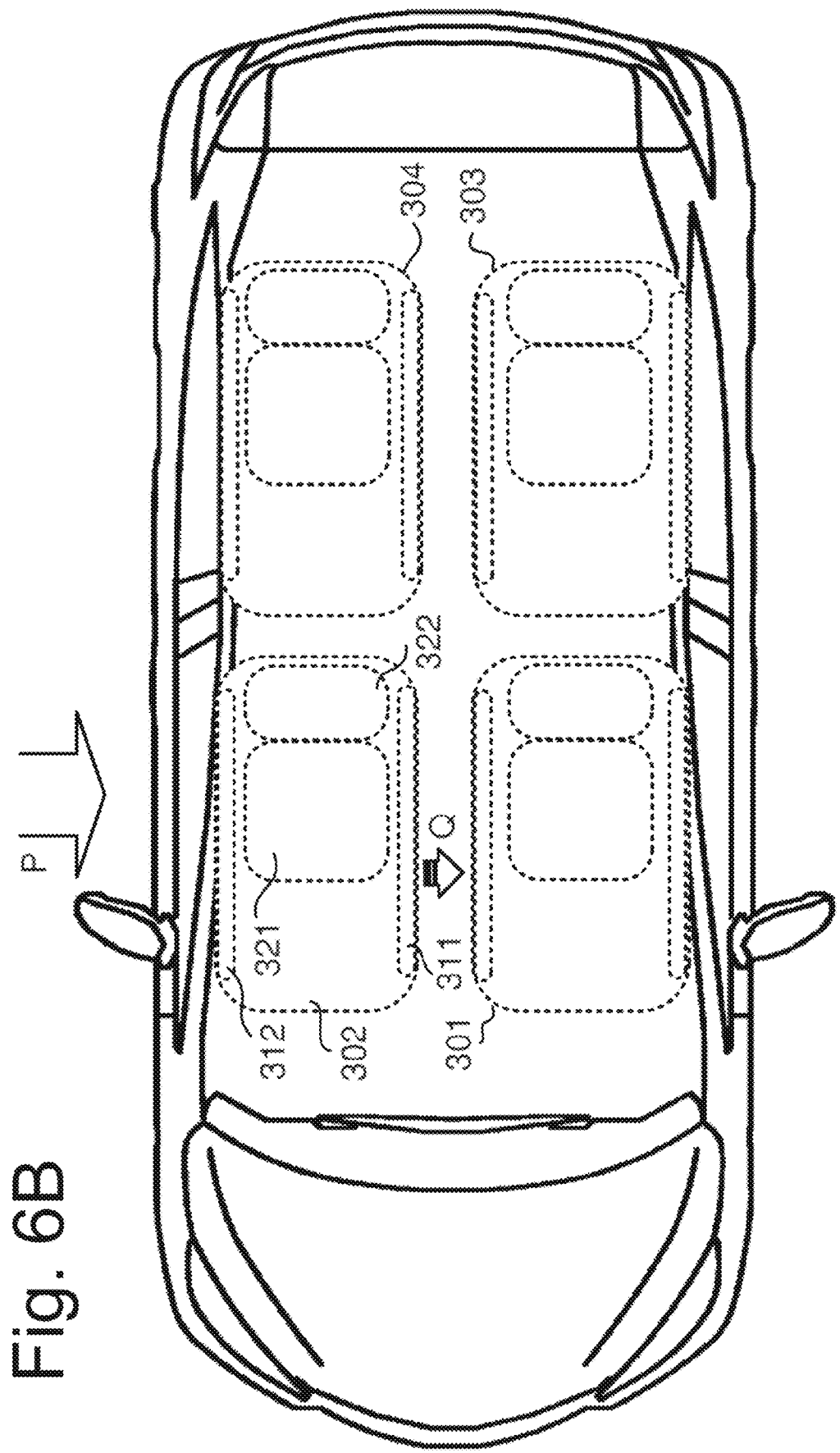

This embodiment is normally arranged as shown in FIGS. 6A and 6B, and there are a total of four compartments 301-304 in the four-seater vehicle, one corresponding to one passenger. Each compartment includes a seat having a seat surface 321 and a backrest 322 inside partitions, and a passenger sits on this seat when on board. Each compartment further includes buffer forming devices 311, 312. The roof is of a type that can be opened. For example, the roof opens by force from below and opens and closes by an opening and closing mechanism. The opening and closing mechanism may be a polycarbonate sunroof that occupies a large part of the roof (panorama roof), and the sunroof is configured to come off due to a collision with the compartment. In addition, the roof of the sunroof may open instantly, allowing the compartment to pass through.

Underneath each compartment 301-304 are a launch device 331 and a directional guidance mechanism 502. The launch device 331 includes an explosive.

When the processing unit 130 predicts a collision from the right direction of the vehicle toward a passenger sitting on the front-right of the vehicle, the passengers is caused to be evacuated to a location not affected by the collision by the launch device 331 located under the compartment 302 ejecting the compartment 302 of the passengers upward (in the direction of Arrow R) along a direction guided by the direction guidance mechanism 502. When the compartment 302 is launched, the buffer forming device 311 forms an airbag around the compartment 302 to protect it from a collision while mitigating the impact of the passengers when the compartment 302 falls down. Although a passenger wearing a seatbelt 333 is not illustrated in FIG. 8, the passenger is wearing a seatbelt 333 during operation. Preferably, the launch device 331 may be configured to be actually ejected by the passenger pressing an acknowledging button (not illustrated) for the ejection after being prompted by voice, thereby preventing an unexpected ejection.

The string-like member 520 has elasticity and is connected to the direction guidance mechanism 502 and the compartment 302. The directional guidance mechanism 502 prevents the compartment 302 from going far by the string-like member 520 while preventing a strong impact force from being applied to the compartment 302 by the elasticity of the string-like member 520. By causing the string-like member 520 to break after being pulled strongly, the impact on the passengers can be further reduced.

The processing unit 130 may predict the falling position to executes the ejection only when it determines that there is no problem. Instead of causing the compartment 302 to free-fall upon the compartment 302 is ejected upward, the direction guidance mechanism 502 may avoid the free-fall by forming a support member 530 for supporting the compartment 302. The support member 530 is a rod-shaped object that can be extended or retracted by, for example, a telescope-type elongating and retracting mechanism. In an embodiment in which the sunroof made of polycarbonate is knocked on and is removed upon the ejection, it is preferable that the removed sunroof functions as a buffer or a support member.

(7) Moving a Buffer on the Roof]

FIG. 9 shows a vehicle according to an embodiment in which a buffer on the roof is moved upon collision prediction. A buffer driving mechanism 612 is fixed on the roof, and a buffer 610 is disposed thereon. The buffer 610 allows to provide convenience to the user by having a photovoltaic cell, a retractable extending roof, a pop-up type bed, or a pop-up type foldable type tent.

When the processing unit 130 predicts a collision from the right side of the vehicle toward a passenger sitting on the right side of the vehicle, the processing unit 130 moves the buffer 610 toward the right side of the vehicle by the buffer driving mechanism 612 to move the buffer 610 to the outside of the door on the right side of the vehicle. This can reduce the impact of the collision on the passengers.

(8) Forming a Buffer as a Result of Expansion of the Buffer Forming Device]

Figure 9A:
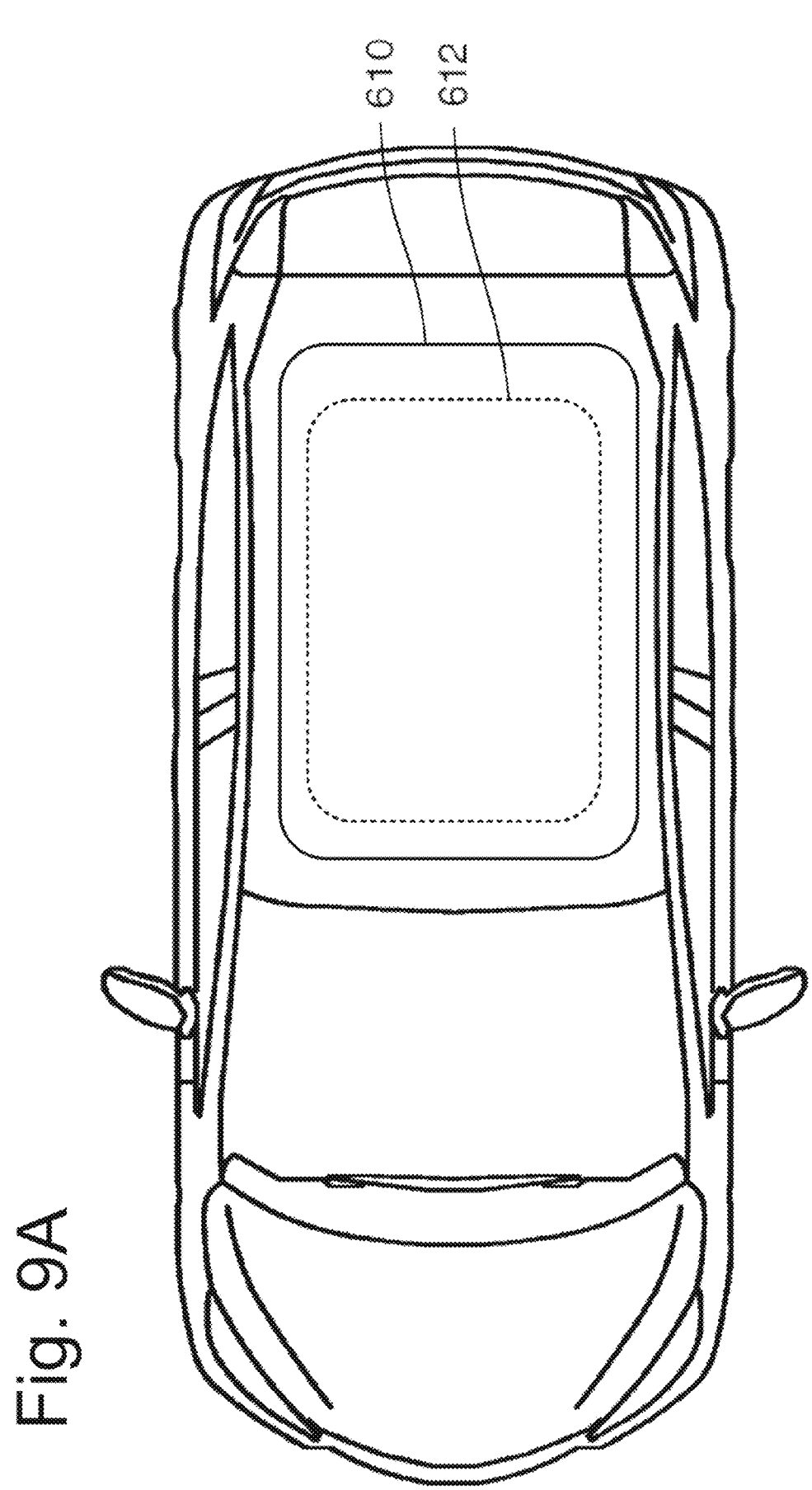
FIGS. 9A-9B show a vehicle according to an embodiment in which a buffer on the roof is moved upon the collision prediction.
Figure 10:
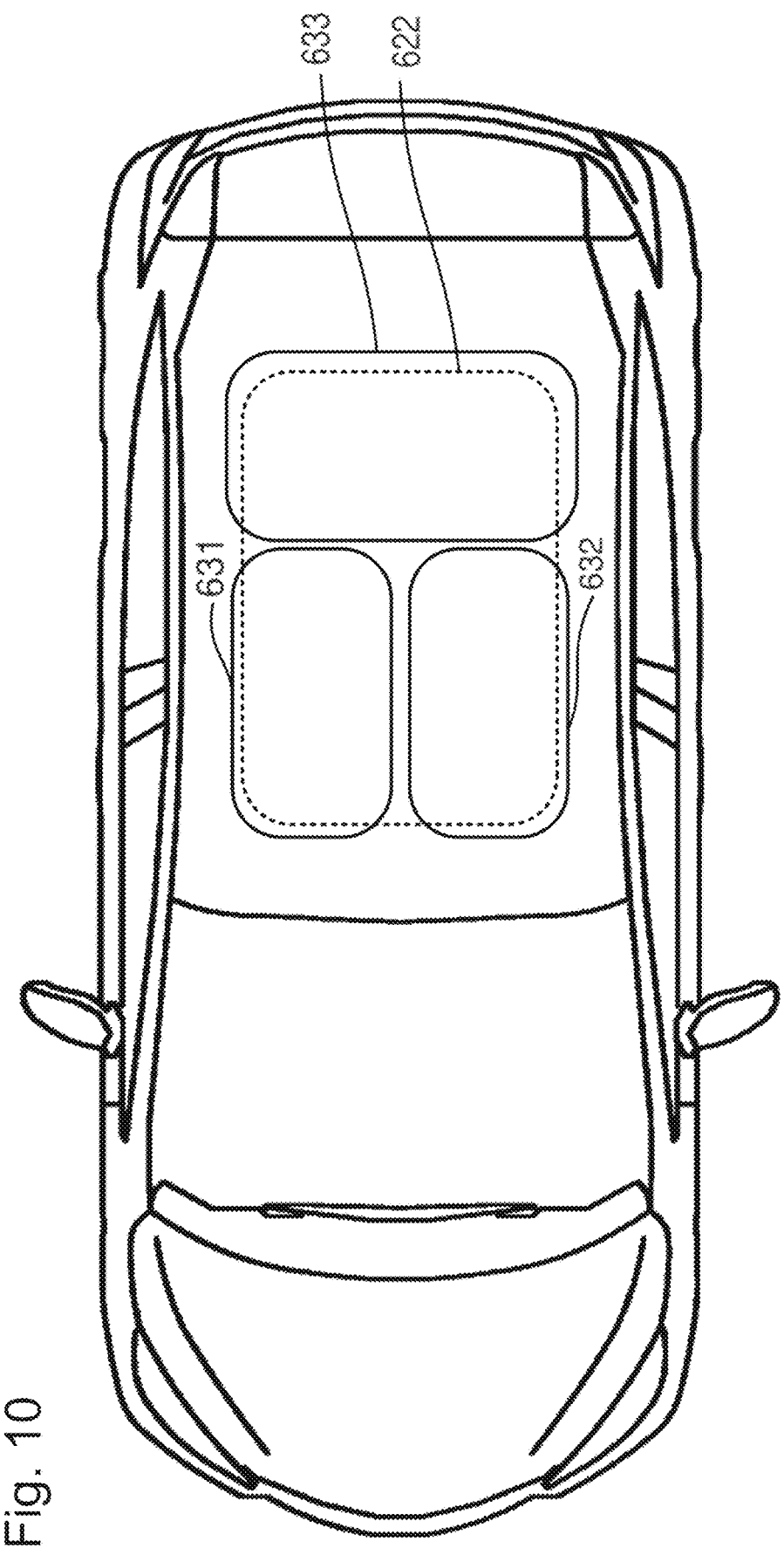
FIG. 10 shows a top view of a vehicle including a plurality of buffer forming devices.

FIG. 10 shows a vehicle according to an embodiment in which there are a plurality of buffer forming devices 631-633 that can be expanded as compared with FIG. 9A, and only the buffer forming device corresponding to the collision direction moves and expands upon the collision prediction.

Figure 9B:
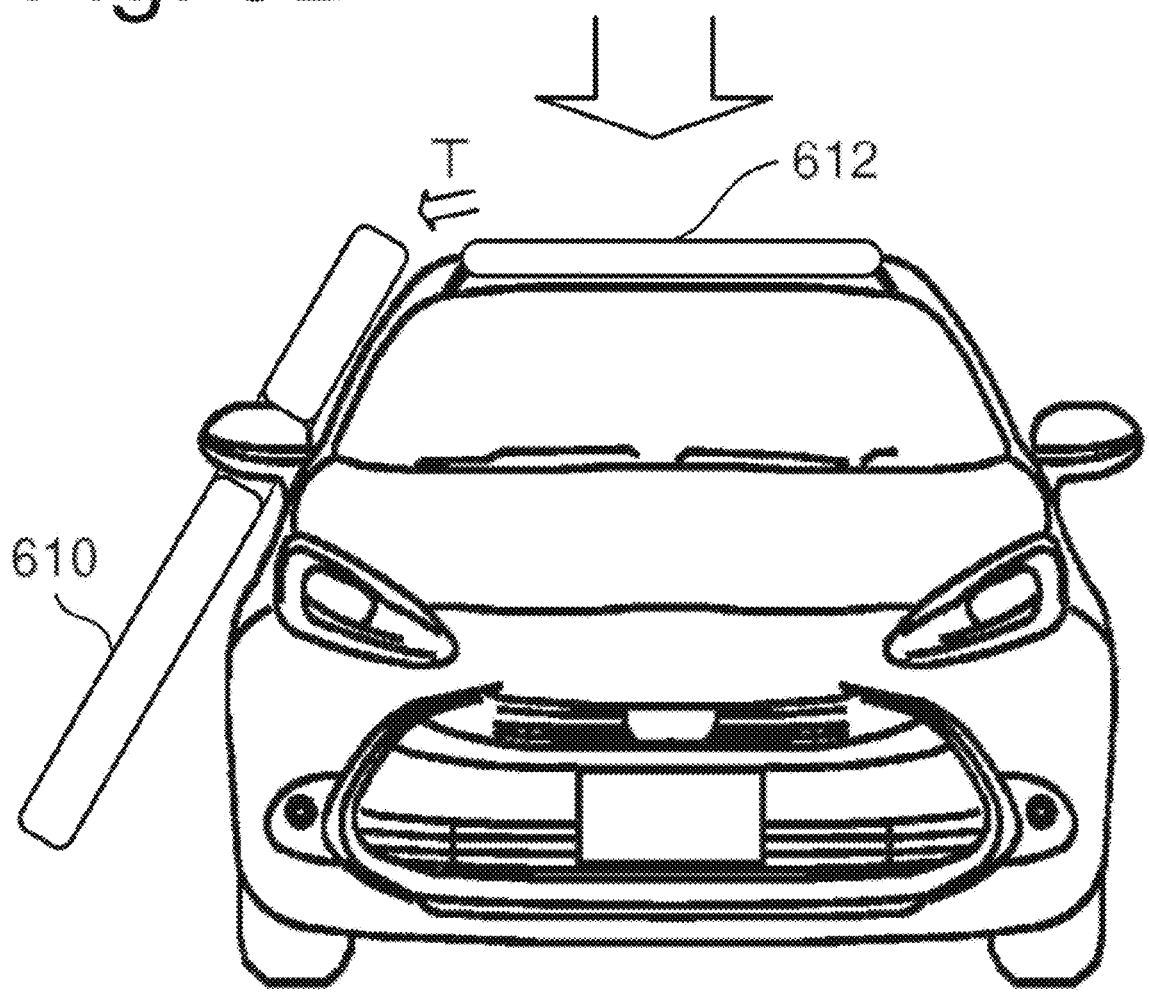

When the processing unit 130 predicts a collision from the right side of the vehicle toward a passenger sitting on the right side of the vehicle, the processing unit 130 moves only the buffer forming device 631 out of the plurality of buffer forming devices 631-633 by the buffer driving mechanism 622 toward the right side of the vehicle, and expands the buffer forming device 631 to form a buffer such as a buffer 610 (FIG. 9B), and moves the buffer to outside of the door on the right side of the vehicle as shown in FIG. 9B. The buffer 610 is preferably a type of an airbag that is ejected out of the vehicle and detached from the vehicle, except for a string-like member for keeping the buffer within a predetermined distance from the vehicle if there is a string-like member. This can reduce the impact of the collision on the passenger and the other party of the collision.

The buffer forming device can be mechanically expanded by means of an expansion mechanism or an airbag. The buffer can also be chemically enlarged by, for example, forming solids such as foams. In the embodiments of FIGS. 9 and 10, the buffer driving mechanism and the buffer forming device may be on the lower part of the vehicle body, not on the roof. In this case, the buffer driving mechanism includes a direction change mechanism to the upper side. This direction change mechanism makes the buffer rise up well from the vehicle body when the buffer is moved out to the outside. In the embodiments of FIGS. 9 and 10, the buffer driving mechanism and the buffer forming device may be located on the doors 122, 124, the bumpers of the vehicle body (bumpers on the front side, rear side, etc.) rather than on the roof.

In all embodiments, by using a battery or a battery case assembly in a vehicle (e.g., electric vehicle, hybrid vehicle) having an electric driving function as a buffer or a buffer forming device, a strong buffer can be obtained while reducing additional weight of an object mounted on the vehicle.

The present invention is not limited to the embodiments described with reference to the drawings, and one can conceive of alternative embodiments without departing from the scope of the present invention. A feature in an embodiment can be combined with features in another embodiment to exhibit an advantageous effect that can be understood by those skilled in the art, even if it is not explicitly stated.

REFERENCE SIGNS LIST

100: passenger vehicle
104: headlight
108, 114: license plate
106: front bumper
104: side mirror
112: taillight
116: wheel
122, 124: boarding door
118: roof
130: processing unit
132, 154, 156, 158, 162, 164, 165: object sensor
134, 136, 138, 142, 144, 146, 148, 152, 171-174, 202, 204, 206, 212, 214, 216: buffer forming device
170: add-on type device
201, 215, 203, 211, 205, 213, 252, 255, 251, 254, 253, 256: cavity
231-236: valve
241-246: pipe
301-304: compartment
321: seat surface
322: backrest
311, 312: occupant protection device
333: seat belt
331: launch device
388: shrinkage portion of compartment
502: directional guidance mechanism
520: string-like member
530: supporting member
610: buffer
612, 622: buffer driving mechanism

The invention claimed is:

1. A passenger vehicle (100) for travelling on a road, comprising:
a processing unit (130);
object sensors (132, 154, 156, 158, 162, 164, 165) arranged on a plurality of locations in a plurality of directions with respect to a center of the passenger vehicle and capable of sensing an external object; and buffer forming devices arranged on a plurality of locations in a plurality of directions with respect to the center of the passenger vehicle, wherein the processing unit is connected to the object sensors and the buffer forming devices, and predicts a collision of the passenger vehicle with an external object by input from the object sensor, and the processing unit predicts, when predicting a collision, the direction or location of the collision and causes a buffer forming device to form a buffer corresponding to the direction or location of the predicted collision, thereby reducing an impact of the collision on the passenger by the buffer, the passenger vehicle is further characterized in that, when predicting a collision, an adjacent compartment to the compartment closest to the predicted collision is moved to the opposite side to the predicted collision, in order to mitigate the impact of the collision, and a door which is on a side of the adjacent compartment and on the opposite side to the predicted collision is opened to move the adjacent compartment furthermore.

2. A passenger vehicle (100) for travelling on a road, comprising:

a processing unit (130);

object sensors (132, 154, 156, 158, 162, 164, 165) arranged on a plurality of locations in a plurality of directions with respect to a center of the passenger vehicle and capable of sensing an external object; and buffer forming devices arranged on a plurality of locations in a plurality of directions with respect to the center of the passenger vehicle, wherein the processing unit is connected to the object sensors and the buffer forming devices, and predicts a collision of the passenger vehicle with an external object by input from the object sensor, and the processing unit predicts, when predicting a collision, the direction or location of the collision and causes a buffer forming device to form a buffer corresponding to the direction or location of the predicted collision, thereby reducing an impact of the collision on the passenger by the buffer, the passenger vehicle is further characterized in that, the compartment closest to the predicted collision is moved upwards in order to mitigate the impact of the collision, and when the compartment is moved upwards, a roof of the passenger vehicle opens.

3. The passenger vehicle according to claim 2, wherein when the compartment is moved upwards, a member which is connected between the compartment and the vehicle for keeping the compartment within a predetermined distance from the passenger vehicle prevents the compartment from going too far.

4. The passenger vehicle according to claim 3, wherein the member has elasticity in order to prevent a strong impact force being applied to the compartment.

5. The passenger vehicle according to claim 2, wherein the roof is opened by causing a part of the roof to come off as a result of a collision with the compartment.

6. The passenger vehicle according to claim 2, wherein the compartment closest to the predicted collision is moved upwards after an acknowledgement operation by the passenger acknowledging the compartment to move upwards.

7. The passenger vehicle according to claim 2, further comprising:

a direction guiding mechanism (502) for guiding a direction of the compartment when the compartment is moved upwards; and a support member (530) for supporting the compartment and avoiding a fall after the compartment is moved upwards.

* * * * *